United States Patent [19]
Goosey, Jr.

[11] Patent Number: 5,604,637
[45] Date of Patent: Feb. 18, 1997

[54] ZOOM LENS

[75] Inventor: William T. Goosey, Jr., Fairport, N.Y.

[73] Assignee: Eastman Kodak Company, Rochester, N.Y.

[21] Appl. No.: 423,341

[22] Filed: Apr. 17, 1995

[51] Int. Cl.[6] .................................................. G02B 15/14
[52] U.S. Cl. ................................... 359/689; 359/686
[58] Field of Search ................................ 359/689, 686, 359/683, 676

[56] References Cited

U.S. PATENT DOCUMENTS

| | | | |
|---|---|---|---|
| 4,370,031 | 1/1983 | Ikemori | 359/681 |
| 4,726,665 | 2/1988 | Itoh | 359/689 |
| 4,730,907 | 3/1988 | Kikuchi et al. | 359/689 |
| 4,810,072 | 3/1989 | Takahashi | 359/689 |
| 4,955,700 | 9/1990 | Yamaguchi | 359/689 |
| 5,035,492 | 7/1991 | Ito | 359/676 |
| 5,138,493 | 8/1992 | Iwasaki | 359/689 |
| 5,216,547 | 6/1993 | Ogata | 359/689 |
| 5,260,833 | 11/1993 | Ito et al. | 359/689 |
| 5,268,792 | 12/1993 | Kreitzer et al. | 359/689 |
| 5,313,328 | 5/1994 | Aoki | 359/684 |
| 5,481,405 | 1/1996 | Simbal | 359/689 |

*Primary Examiner*—Scott J. Sugarman
*Attorney, Agent, or Firm*—Leonard W. Treash, Jr.

[57] ABSTRACT

A zoom lens particularly usable in a color printer includes a first movable negative unit, a second movable positive unit and a third fixed unit. The third fixed unit has a single meniscus lens component having front and rear surfaces with a curvature within eight percent of each other. Preferably, the second movable positive unit includes a negative element having an Abbe V number between 41 and 47, which is part of a cemented triplet having Abbe V numbers higher than that of the negative element.

17 Claims, 9 Drawing Sheets

ZOOM LENS

This invention relates to a zoom lens of the type having a first movable negative unit, a second movable positive unit and a third fixed unit. Although not limited thereto, it is particularly usable as a color printer lens.

U.S. Pat. No. 5,035,492 to Itoh, granted Jul. 30, 1991; U.S. Pat. No. 4,810,072 to Takahashi, granted Mar. 7, 1989; and U.S. Pat. No. 4,726,665 to Itoh, granted Feb. 23, 1988, show relatively complex camera zoom lenses having three units. They include a first negative unit of three or more elements which is movable during zooming, a second positive unit of four or more elements, including at least one negative element, which is also movable for zooming, and a third fixed unit. The third unit can be a single element or a doublet. The fixed third unit is said to increase the focal length of the lens and appears to contribute to the compactness of the lens. These lenses appear to be corrected over a zoom range of up to two to one.

Zoom printer lenses require as high or higher corrections for most aberrations as a camera lens, but not necessarily over the same field. They do not generally need to be as compact. However, weakness in any correction reduces the depth of focus of the lens which in turn reduces its robustness in use. Secondary color (sometimes called "secondary spectrum") is especially difficult to correct for but important to correct for in a color printer lens.

SUMMARY OF THE INVENTION

Applicant has found that a lens generally of the type described, but with significant modifications, can be adapted to use as a color printer lens with remarkable results.

According to the invention, a zoom lens usable as a color printer lens is provided having in order, from front to rear, a first movable negative unit, a second movable positive unit, and a third fixed unit.

According to a preferred embodiment, the third fixed unit has front and rear surfaces with radii of curvature within eight percent of each other, preferably within three percent of each other.

According to another preferred embodiment, the second unit includes a negative element made of a glass having an abbe number between 41 and 47. Preferably, the abbe number in the negative element is between 44 and 45, and the element has an index of refraction for the D line of the spectrum between 1.60 and 1.63.

According to another preferred embodiment, the second movable positive unit has a bi-concave negative element which makes up the middle element in a cemented triplet. The glasses in the cemented triplet are chosen such that the Abbe V numbers for both the outer elements in the triplet are greater than that of the biconcave negative element. Preferably, such Abbe V numbers are substantially greater in the positive elements of the cemented triplet than that of the middle negative element.

What applicant has found is that lenses constructed according to the invention provide superior corrections to the prior camera lenses over as much as a 3× zoom range when used at typical fields required for color printer zoom lenses.

Although the invention is not restricted to a particular use, according to a preferred embodiment, the invention is used in a color printer.

DETAILED DESCRIPTION OF THE INVENTION

Figure 1:
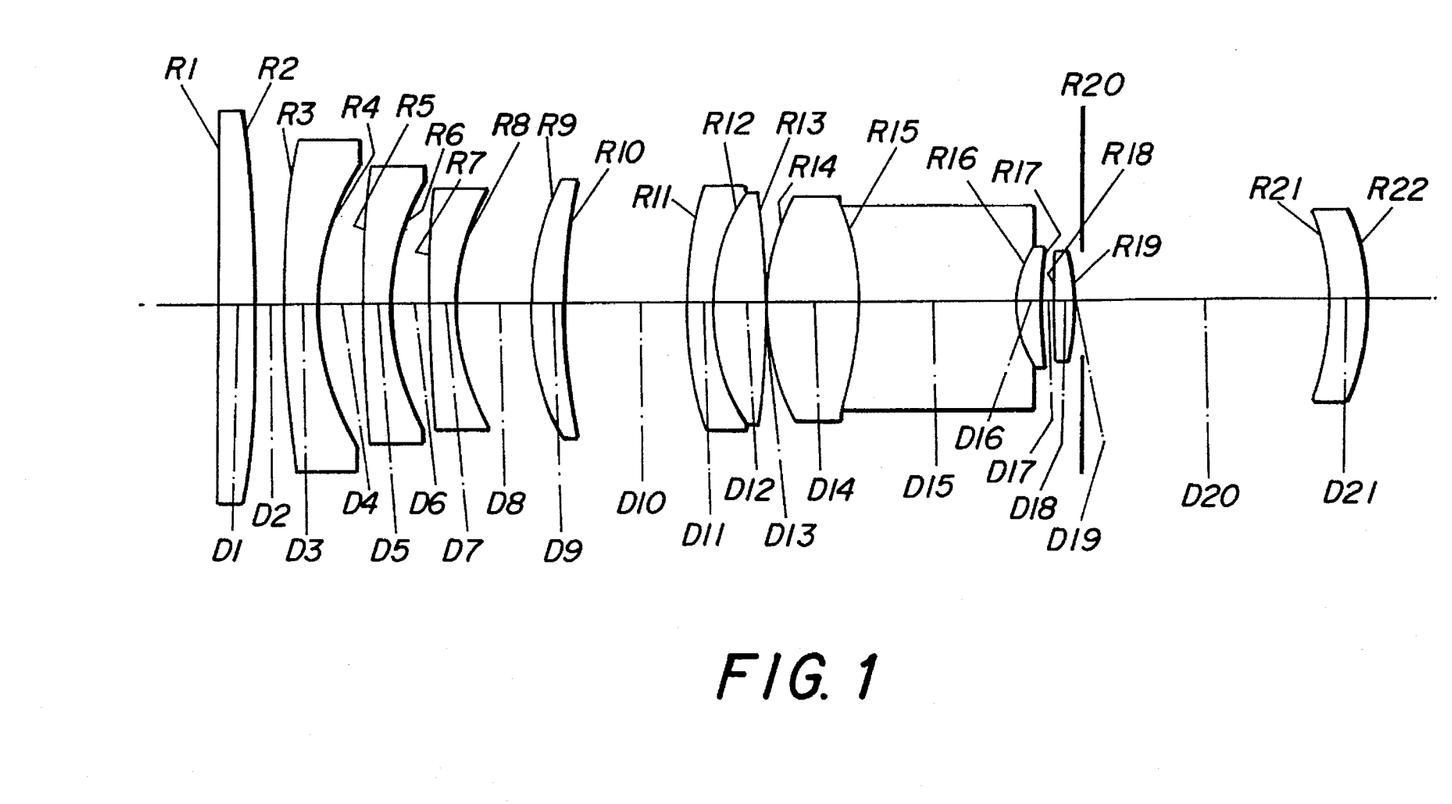
FIG. 1 is a side schematic of a zoom lens.
Figure 2A:
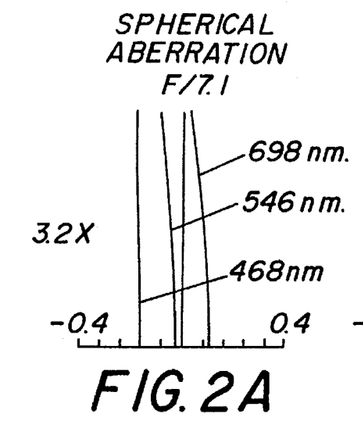
FIG. 2 is a composite graph of aberration corrections for the lens shown in FIG. 1 and Example 1 at various magnifications and wavelengths.
Figure 2B:
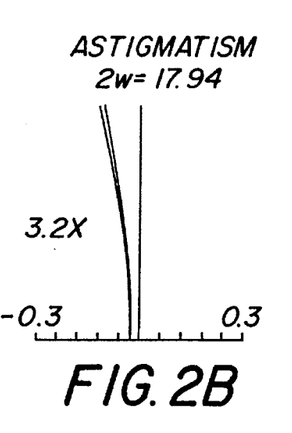
Figure 2C:
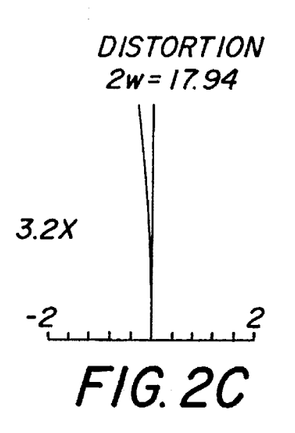
Figure 2D:
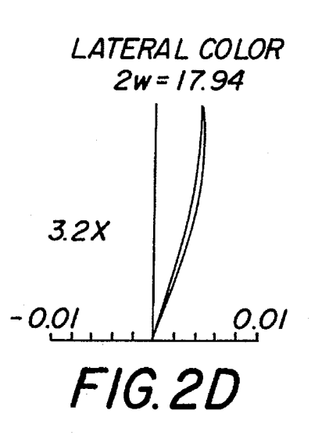
Figure 2E:
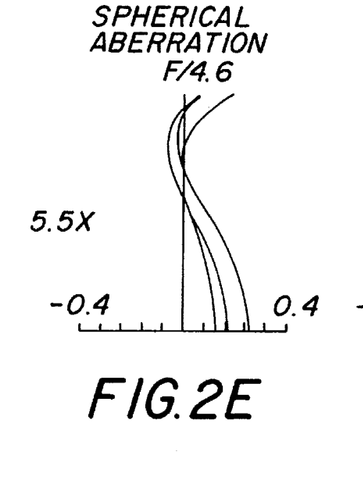
Figure 2F:
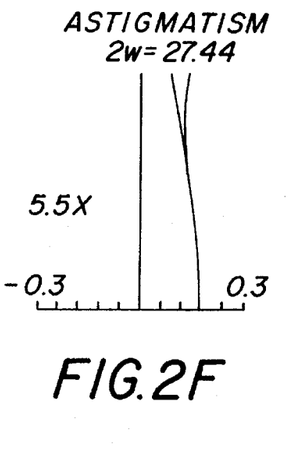
Figure 2G:
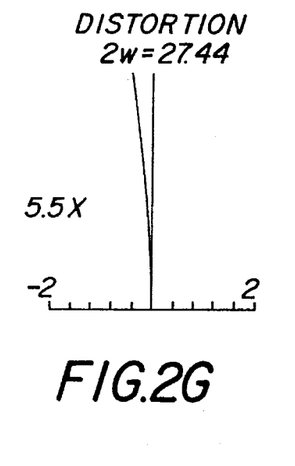
Figure 2H:
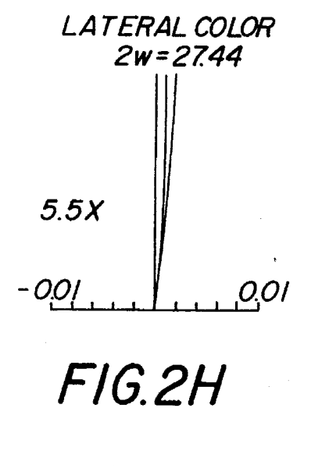
Figure 2I:
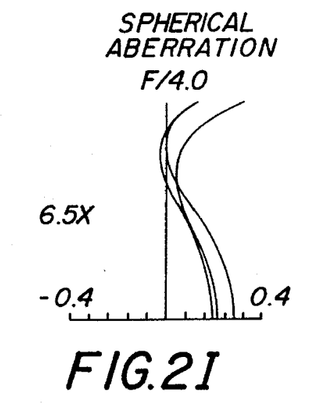
Figure 2J:
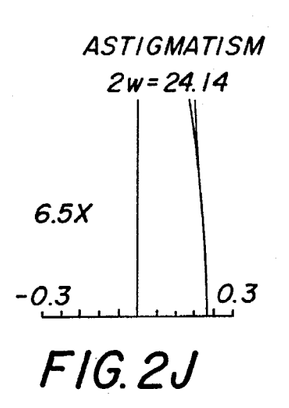
Figure 2K:
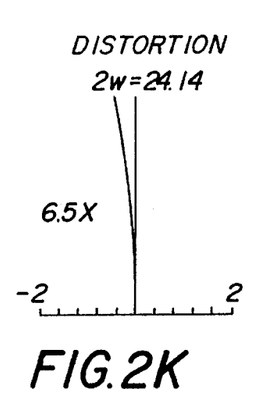
Figure 2L:
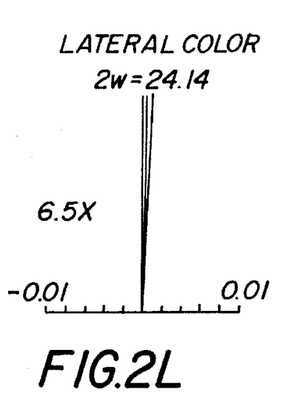
Figure 2M:
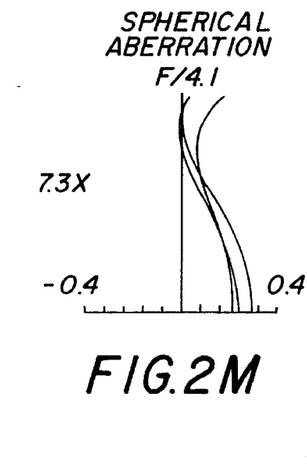
Figure 2N:
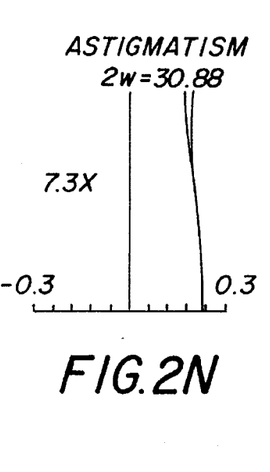
Figure 2O:
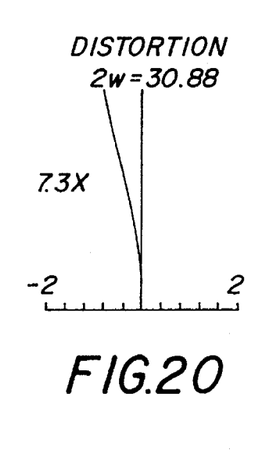
Figure 2P:
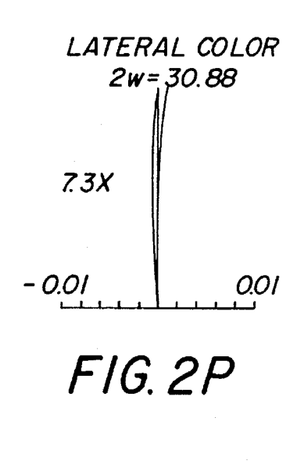
Figure 2Q:
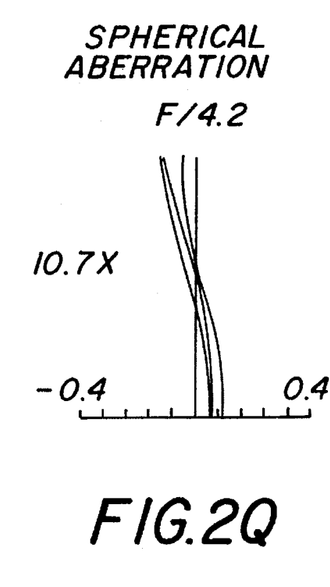
Figure 2R:
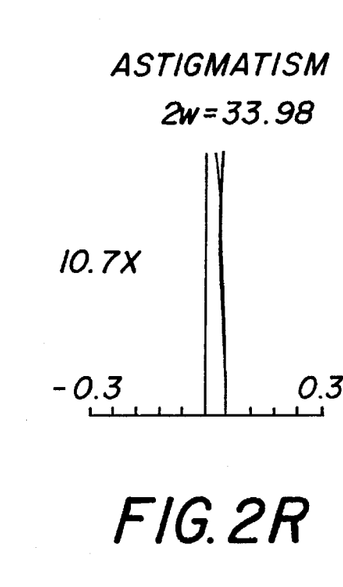
Figure 2S:
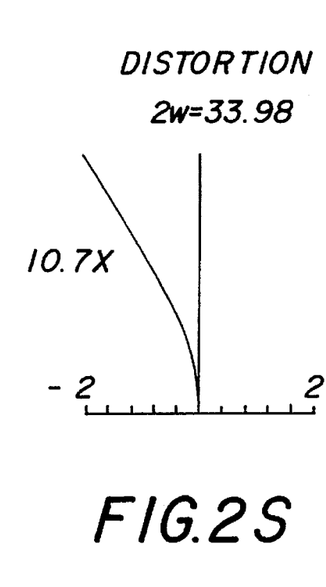
Figure 2T:
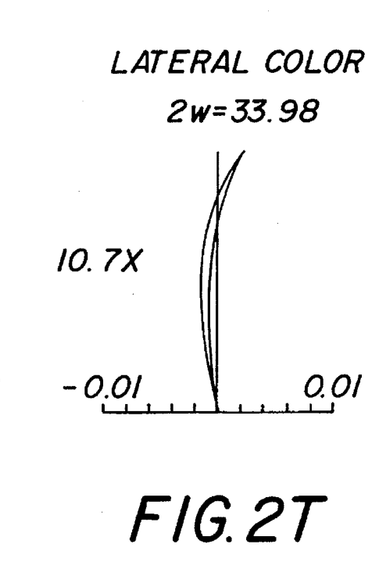
Figure 3:
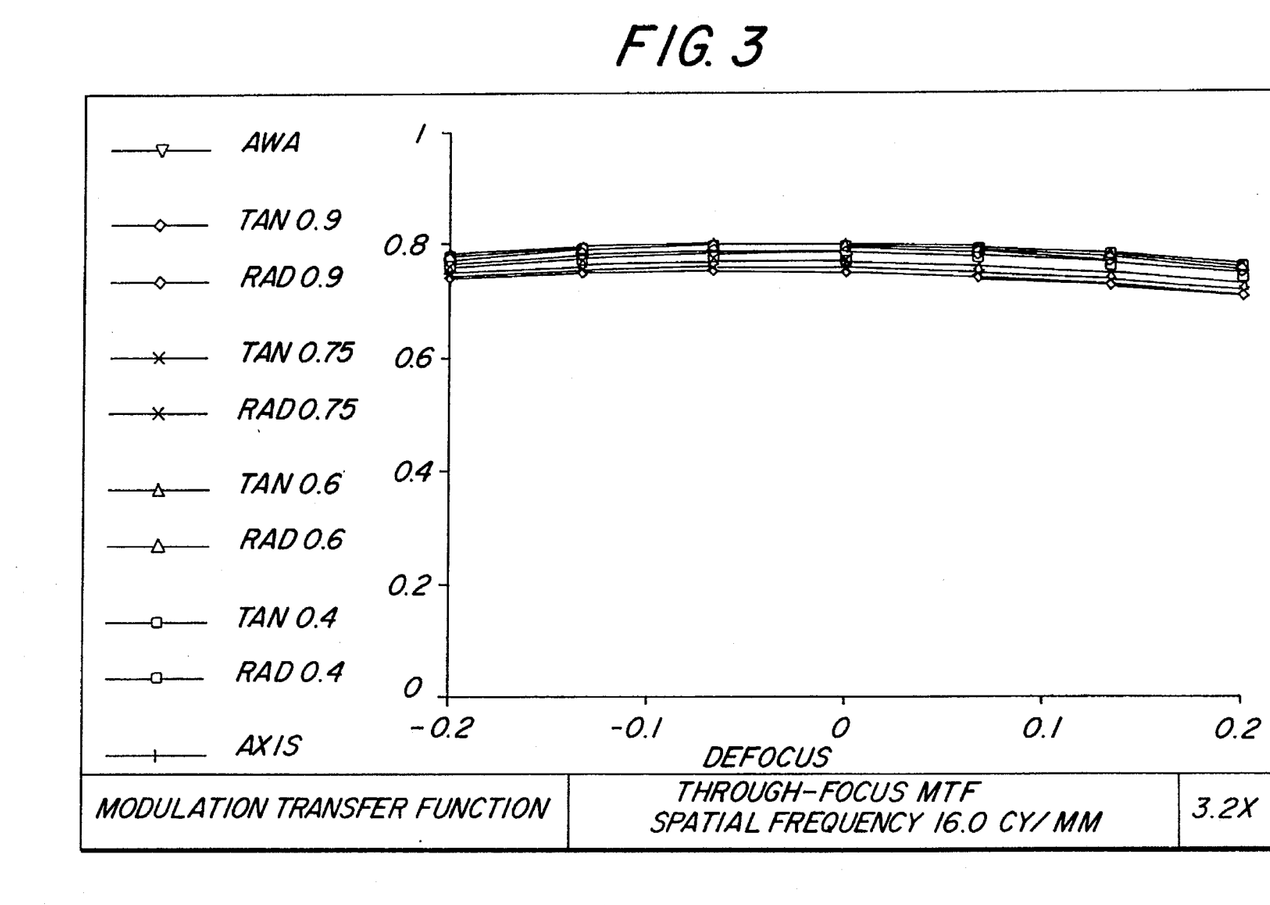
FIG. 3–7 show the modulation transfer function (MTF) for the lens shown in FIG. 1 at various magnifications.
Figure 4:
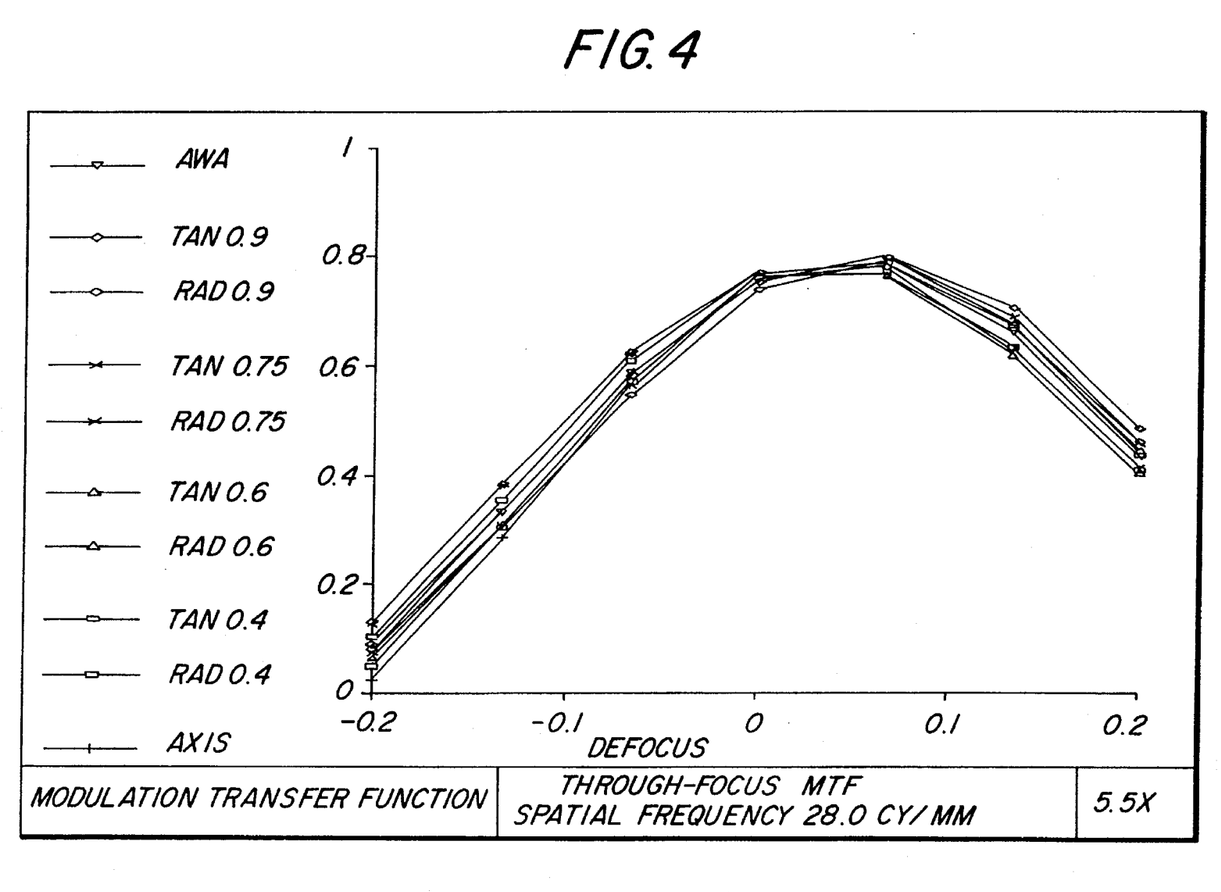
Figure 5:
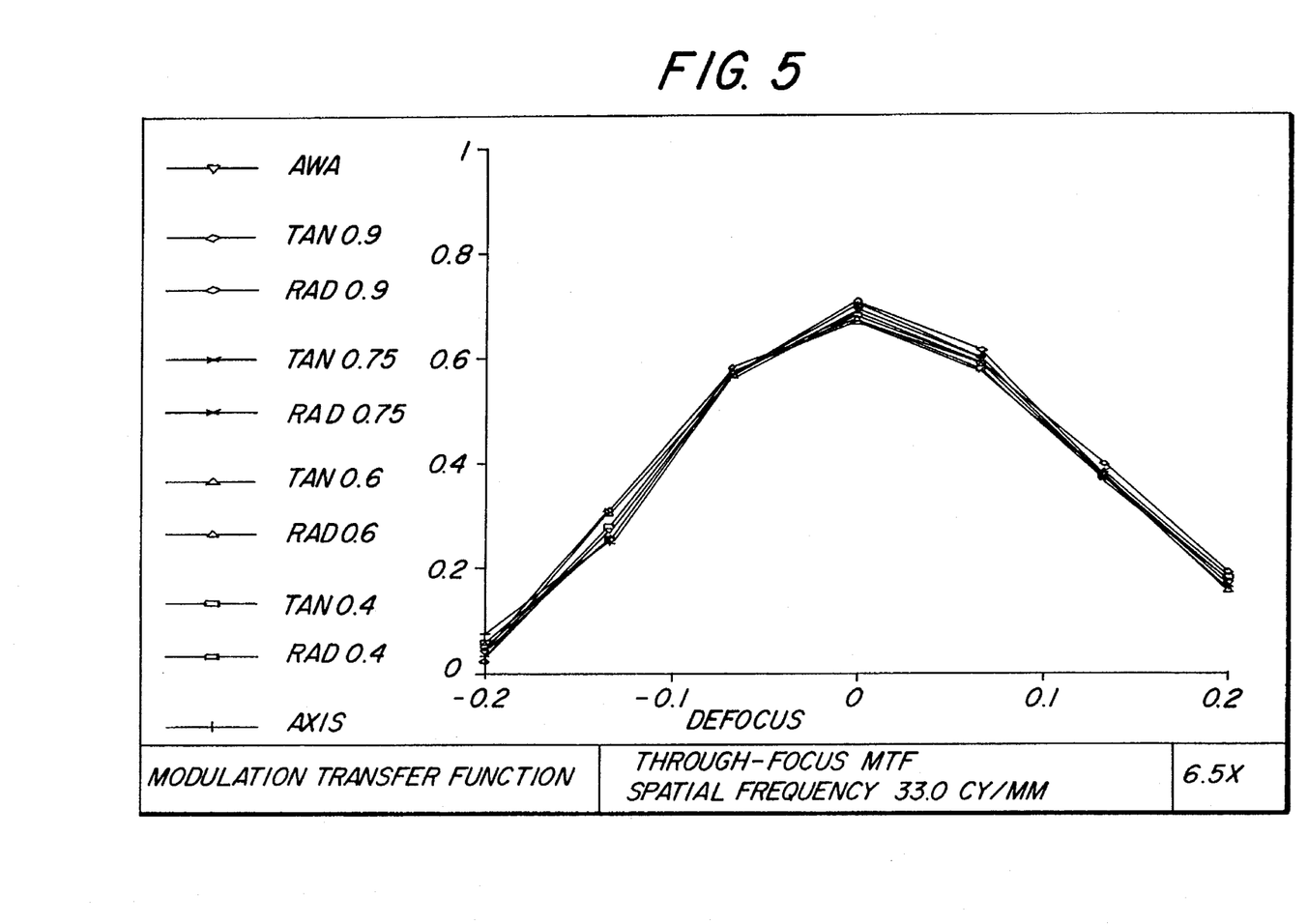
Figure 6:
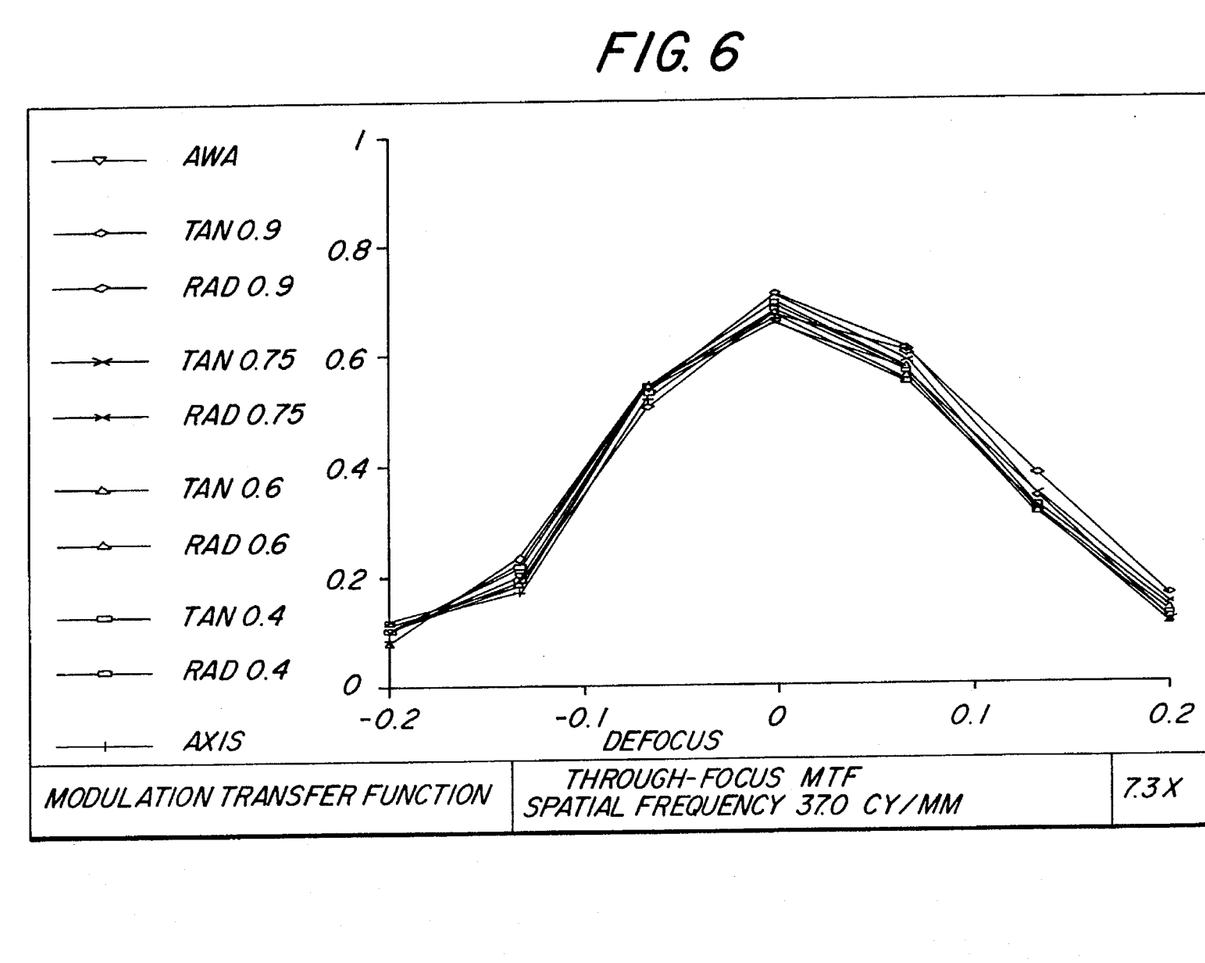
Figure 7:
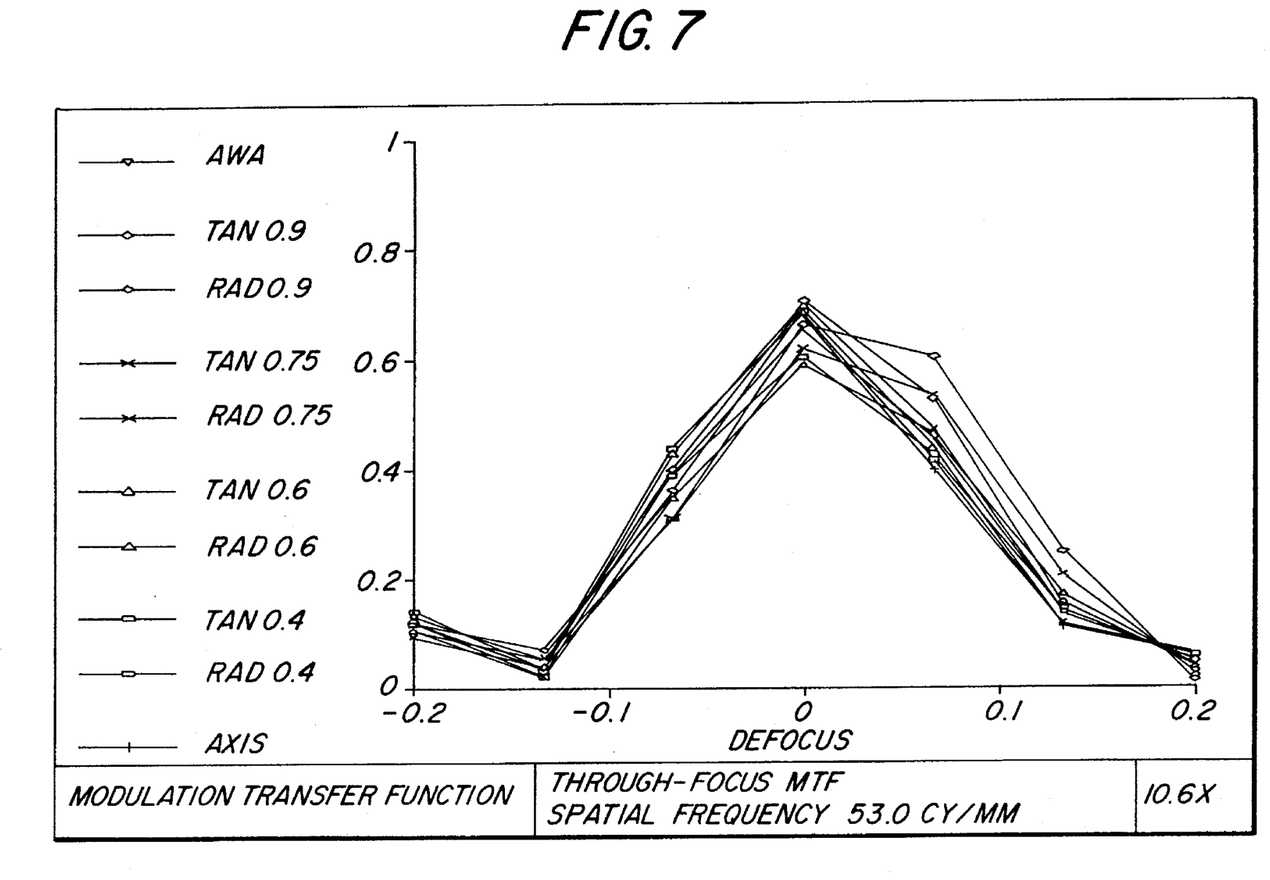

Both of the following examples are substantially described by FIG. 1. The aberration corrections and MTF results, shown in FIGS. 2–7, are for Example 1. Example 2 is similarly well corrected, although Example 1 is somewhat superior for some magnifications.

In the following examples, the radii of curvature R and the distances D are numbered from front to rear and are in millimeters. The indices of refraction are for the D line of the spectrum and V is the abbe number for the glasses to be used. All other distances are also in millimeters.

EXAMPLE 1

(FIG. 1)

| F = 33.48–93.31 | FNO = 1:4.21–7.14 | 2ω = 34.72°–17.94° | |
|---|---|---|---|
| R1 = 1428.76 | D1 = 6.76 | N1 = 1.48749 | V1 = 70.4 |
| R2 = −275.19 | D2 = 4.80 | | |
| R3 = 207.32 | D3 = 6.00 | N3 = 1.48749 | V3 = 70.4 |
| R4 = 46.57 | D4 = 8.00 | | |
| R5 = 198.31 | D5 = 5.00 | N5 = 1.48749 | V5 = 70.4 |
| R6 = 44.51 | D6 = 6.69 | | |
| R7 = 258.05 | D7 = 5.00 | N7 =1.48749 | V7 = 70.4 |
| R8 = 42.22 | D8 = 13.00 | | |
| R9 = 53.29 | D9 = 5.60 | N9 = 1.71736 | V9 = 29.5 |
| R10 = 106.27 | D10 = Variable | | |
| R11 = 79.51 | D11 = 4.70 | N11 = 1.80400 | V11 = 46.6 |
| R12 = 38.89 | D12 = 9.07 | N12 = 1.48749 | V12 = 70.4 |
| R13 = −174.55 | D13 = 0.20 | | |
| R14 = 45.91 | D14 = 16.09 | N14 = 1.62014 | V14 = 63.5 |
| R15 = −54.09 | D15 = 27.00 | N15 = 1.61340 | V15 = 44.3 |
| R16 = 18.81 | D16 = 4.62 | N16 = 1.48749 | V16 = 70.4 |

-continued

| | | | |
|---|---|---|---|
| R17 = 76.76 | D17 = 2.27 | | |
| R18 = 139.08 | D18 = 3.21 | N18 = 1.54739 | V18 = 53.6 |
| R19 = −79.51 | D19 = 1.000 | | |
| R20 = Diaphragm | D20 = Variable | | |
| R21 = −50.43 | D21 = 6.37 | N21 = 1.72825 | V21 = 28.4 |
| R22 = −50.43 | D22 = 50.24 | | |

Separations during Zooming

| | Focal Length | | | | |
|---|---|---|---|---|---|
| Separation | 33.48 | 41.16 | 49.23 | 63.34 | 93.31 |
| D10 | 77.12 | 55.11 | 39.43 | 21.66 | 2.00 |
| D20 | 7.44 | 16.24 | 25.86 | 43.86 | 88.13 |

The corrections for spherical aberration, astigmatism, distortion and lateral color for a lens constructed according to Example 1 for various magnifications are shown in FIG. 2 with the F number given for the spherical aberration and the field 2ω given for the astigmatism, distortion and lateral color. FIGS. 3–7 show the modulation transfer function (MTF) for various magnifications, 3.2× to 10.6× for both the radial and tangential rays and an area weighted average. The height and breadth of the modulation transfer function curves is remarkable for this type of printer lens and therefore, provides excellent depth of focus. Depth of focus is critical to robustness in a color printer lens.

EXAMPLE 2

(FIG. 1)

| F = 33.50–94.06 | FNO = 1:4.21–7.14 | 2ω = 33.96°–17.94° | |
|---|---|---|---|
| R1 = Plano | D1 = 6.60 | N1 = 1.48749 | V1 = 70.4 |
| R2 = −231.73 | D2 = 4.70 | | |
| R3 = 212.97 | D3 = 4.00 | N3 = 1.48749 | V3 = 70.4 |
| R4 = 49.84 | D4 = 3.89 | | |
| R5 = 105.52 | D5 = 4.00 | N5 = 1.48749 | V5 = 70.5 |
| R6 = 42.92 | D6 = 6.49 | | |
| R7 = 541.60 | D7 = 4.00 | N7 = 1.48749 | V7 = 70.5 |
| R8 = 42.92 | D8 = 14.85 | | |
| R9 = 55.28 | D9 = 5.42 | N9 = 1.71736 | V9 = 29.5 |
| R10 = 105.92 | D10 = Variable | | |
| R11 = 89.88 | D11 = 2.93 | N11 = 1.80400 | V11 = 46.6 |
| R12 = 34.44 | D12 = 8.91 | N12 = 1.62014 | V12 = 63.5 |
| R13 = −929.99 | D13 = 0.20 | | |
| R14 = 46.96 | D14 = 16.09 | N14 = 1.62014 | V14 = 63.5 |
| R15 = −60.10 | D15 = 26.93 | N15 = 1.61340 | V15 = 44.3 |
| R16 = 16.98 | D16 = 5.12 | N16 = 1.51800 | V16 = 43.9 |
| R17 = 167.81 | D17 = 2.15 | | |
| R18 = −563.86 | D18 = 2.94 | N18 = 1.60600 | V18 = 43.9 |
| R19 = −71.01 | D19 = 1.00 | | |
| R20 = Diaphrgm | D20 = Variable | | |
| R21 = −51.04 | D21 = 4.46 | N21 = 1.72825 | V21 = 28.4 |
| R22 = −50.04 | | | |

Separations during Zooming

| | Focal Length | | | |
|---|---|---|---|---|
| Separation | 33.50 | 49.65 | 63.98 | 94.06 |
| D10 | 84.91 | 42.84 | 23.37 | 1.98 |
| D20 | 7.55 | 25.60 | 43.13 | 86.64 |

In both examples, superiority in corrections is attained, in pan, by inclusion of the weak third fixed unit defined by $R_{21}$, $R_{22}$, $D_{21}$, $N_{21}$ and $V_{21}$. $R_{21}$ and $R_{22}$ are identical in both examples, which is preferred. However, a positive effect on especially off-axis corrections of, for example, astigmatism and field curvature is obtained even though the radii of curvature differ by as much as eight percent, with less than three percent difference preferred.

In both examples, color correction is obtained primarily with a cemented triplet of positive, negative, positive construction, in the second movable positive unit. The second movable positive unit extends from $R_{14}$ to $R_{17}$. In both examples, the middle negative element of the triplet is made from a glass available from Schott Glass Technologies under the designation KZFSN4. It is from a family of glasses that have abnormal partial dispersions. Other such glasses can be used, but preferably, should satisfy the following inequalities:

$0.55 < P_{c,s} < 0.585$ and $0.55 < P_{g,f} < 0.585$ where c, s, g and f are wavelengths of 656.3, 852.1, 435.8 and 486.1 nanometers (nm), respectively. $P_{c,s}$ and $P_{g,f}$ are the partial dispersions for the c and s and the g and f wavelengths, respectively.

In Example 2 one of the positive elements in the cemented triplet (defined by $R_{16}$ and $R_{17}$) has a V number slightly less than the middle negative element. This is a conventional construction for a cemented triplet. However, superior secondary color correction was obtained in Example 1 to that of Example 2 using glasses for the positive elements of the cemented triplet having V numbers greater than that of the negative element, preferably 20 percent greater.

In a color printer a photographic original, which may be a developed color negative film, a color slide or a print, is positioned in an original plane and an image of the photographic original is projected onto a light sensitive material such as photographic paper. In the above examples the front of the lens is the long conjugate image side and is the left side in FIG. 1. The rear of the lens or the right side (FIG. 1) is the short conjugate side and is the side on which the photographic original is positioned. Lenses for color printers have extremely high demands for aberration correction across a modest field. The quality of these corrections determines the depth of focus of the lens which, because of difficulties precisely holding the entire photographic original in a particular position, also very much determines the robustness of the printer. The same compactness that is desired in camera objectives is not required in the printer lens, but other aspects of the lens must be of as high or higher quality.

The invention has been described in detail with particular reference to a preferred embodiment thereof, but it will be understood that variations and modifications can be effected within the spirit and scope of the invention as described hereinabove and as defined in the appended claims.

I claim:

1. A zoom lens comprising, in order, from front to rear:
   a movable negative unit,
   a movable positive unit, the movable positive unit including a cemented triplet, which triplet has a middle negative element between two positive elements, the middle negative element having an Abbe V number less than the Abbe V number of both the two positive elements, and
   a fixed unit, the fixed unit consisting of a single meniscus lens component having front and rear surfaces concave to the front, which front and rear surfaces have radii of curvature having a difference between them less than eight percent of the radius of curvature of the front surface.

2. A zoom lens according to claim 1 wherein said difference is less than three percent of the radius of curvature of the front surface.

3. A zoom lens according to claim 1 wherein the fixed unit consists of a single meniscus element having identical radii of curvature.

4. A zoom lens according to claim 1 wherein the Abbe V number of the two positive elements of the cemented triplet are each more than 20 percent above the Abbe V number of the middle negative element.

5. A zoom lens according to claim 1 wherein said middle negative element is made of a refractive material which satisfies the following inequalities:

$$0.55 < P_{c,s} < 0.585 \text{ and}$$

$$0.55 < P_{g,f} < 0.585$$

where c, s, g and f are wavelengths 656.3, 852.1, 435.8 and 486.1 nanometers, respectively and $P_{c,s}$ is the partial dispersion for the c and s wavelengths and $P_{g,f}$ is the partial dispersion for the g and f wavelengths.

6. A zoom lens according to claim 4 wherein said middle negative element is made of a refractive material which satisfies the following inequalities:

$$0.55 < P_{c,s} < 0.585 \text{ and}$$

$$0.55 < P_{g,f} < 0.585$$

where c, s, g and f are wavelengths 656.3, 852.1, 435.8 and 486.1 nanometers, respectively and $P_{c,s}$ is the partial dispersion for the c and s wavelengths and $P_{g,f}$ is the partial dispersion for the g and f wavelengths.

7. A zoom lens according to claim 1 wherein said middle negative element has an index of refraction for the sodium D line of the spectrum between 1.60 and 1.65 and an Abbe V number between 40 and 45.

8. A zoom lens according to claim 1 and constructed according to the following table:

| F = 33.48–93.31 | FNO = 1:4.21–7.14 | | 2ω = 34.72°–17.94° |
|---|---|---|---|
| R1 = 1428.76 | D1 = 6.76 | N1 = 1.48749 | V1 = 70.4 |
| R2 = −275.19 | D2 = 4.80 | | |
| R3 = 207.32 | D3 = 6.00 | N3 = 1.48749 | V3 = 70.4 |
| R4 = 46.57 | D4 = 8.00 | | |
| R5 = 198.31 | D5 = 5.00 | N5 = 1.48749 | V5 = 70.4 |
| R6 = 44.51 | D6 = 6.69 | | |
| R7 = 258.05 | D7 = 5.00 | N7 = 1.48749 | V7 = 70.4 |
| R8 = 42.22 | D8 = 13.00 | | |
| R9 = 53.29 | D9 = 5.60 | N9 = 1.71736 | V9 = 29.5 |
| R10 = 106.27 | D10 = Variable | | |
| R11 = 79.51 | D11 = 4.70 | N11 = 1.80400 | V11 = 46.6 |
| R12 = 38.89 | D12 = 9.07 | N12 = 1.48749 | V12 = 70.4 |
| R13 = −174.55 | D13 = 0.20 | | |
| R14 = 45.91 | D14 = 16.09 | N14 = 1.62014 | V14 = 63.5 |
| R15 = −54.09 | D15 = 27.00 | N15 = 1.61340 | V15 = 44.3 |
| R16 = 18.81 | D16 = 4.62 | N16 = 1.48749 | V16 = 70.4 |
| R17 = 76.76 | D17 = 2.27 | | |
| R18 = 139.08 | D18 = 3.21 | N18 = 1.54739 | V18 = 53.6 |
| R19 = −79.51 | D19 = 1.000 | | |
| R20 = Diaphragm | D20 = Variable | | |

| | -continued | | |
|---|---|---|---|
| R21 = −50.43 | D21 = 6.37 | N21 = 1.72825 | V21 = 28.4 |
| R22 = −50.43 | D22 = 50.24 | | |

| | Separations during Zooming | | | | |
|---|---|---|---|---|---|
| | Focal Length | | | | |
| Separation | 33.48 | 41.16 | 49.23 | 63.34 | 93.31 |
| D10 | 77.12 | 55.11 | 39.43 | 21.66 | 2.00 |
| D20 | 7.44 | 16.24 | 25.86 | 43.86 | 88.13 | wherein the radii of curvature R and the distances are numbered from front to rear and are in millimeters, the indices of refraction are for the D line of the spectrum and V is the Abbe number.

9. A method of printing in color comprising utilizing a lens constructed according to claim 1 to project an enlarged image of a multicolor original.

10. A zoom lens comprising, in order, from front to rear:
a movable negative unit,
a movable positive unit, the movable positive unit having a cemented triplet having a middle negative element made of a glass having an abbe number between 41 and 47, and
a fixed unit.

11. A zoom lens according to claim 10 wherein the movable negative unit has at least one positive element.

12. A zoom lens according to claim 10 wherein the negative element has an abbe number between 44 and 45 and an index of refraction for the D line of the spectrum between 1.60 and 1.63.

13. A zoom lens according to claim 10 wherein the movable positive unit consists of, from front to rear, a positive doublet, said cemented triplet airspaced from the positive doublet, a positive element airspaced from the triplet and a stop.

14. A zoom lens according to claim 10 wherein the movable negative unit consists of, from front to rear, a positive element, three negative elements airspaced from the positive element and from each other, and a positive element airspaced from the three negative elements.

15. A zoom lens according to claim 10 wherein the cemented triplet includes two positive elements, each of which have higher Abbe V numbers than the negative element.

16. A zoom lens according to claim 15 wherein the Abbe V number of the two positive elements of the cemented triplet are each more than 20 percent above the Abbe V number of the middle negative element.

17. A method of printing in color comprising utilizing a lens constructed according to claim 10 to project an enlarged image of a multicolor original.

* * * * *